（12） United States Patent
Singh et al.

(10) Patent No.: US 8,249,094 B2
(45) Date of Patent: Aug. 21, 2012

(54) WIRELESS MAC AND LINK-LAYER SIMULATION MODELING

(75) Inventors: Pradeep K. Singh, Arlington, VA (US);
Alain J. Cohen, Washington, DC (US);
Alejandro Talavera-Martinez,
Rockville, MD (US); Arun Pasupathy,
Gaithersburg, MD (US); Poonam Singh,
Arlington, VA (US); **Ibrahim Utku
Moral**, Gaithersburg, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 1471 days.

(21) Appl. No.: 11/501,388

(22) Filed: Aug. 9, 2006

(65) Prior Publication Data

US 2007/0036088 A1    Feb. 15, 2007

Related U.S. Application Data

(60) Provisional application No. 60/707,248, filed on Aug. 11, 2005.

(51) Int. Cl.
*H04L 12/413* (2006.01)
(52) U.S. Cl. .................................................. 370/447
(58) Field of Classification Search ............... 370/252, 370/447, 463, 468; 703/22, 25
See application file for complete search history.

(56) References Cited

U.S. PATENT DOCUMENTS 7,336,967 B2 * 2/2008 Kelly et al. .................. 370/468
7,457,931 B1 * 11/2008 Fedorova ..................... 711/167
2003/0012176 A1 * 1/2003 Kondylis et al. ............ 370/348
2005/0055196 A1 * 3/2005 Cohen et al. ................. 703/25
2005/0091024 A1 * 4/2005 Patiejunas .................... 703/14

OTHER PUBLICATIONS

Schwiebert et al., "Mapping to reduce contention in Multiprocessor Architecture", IEEE 7th International Parallel Processing Symposium-Apr. 1993, pp. 248-253.*
Van Dyck et al. , "Distributed sensor Processing over an ad hoc wireless network: Simulation Framework and Performance criteria",vol. 2, Oct. 28-31, 2001 pp. 894-898.*

* cited by examiner

*Primary Examiner* — Anh-Vu Ly
*Assistant Examiner* — Gbemileke Onamuti
(74) *Attorney, Agent, or Firm* — Robert M. McDermott

(57) ABSTRACT

Simulation models of media access control and physical layer characteristics facilitate the simulation/emulation of a variety of phenomena that affect transmissions via a wireless media. Such phenomena include media access contention delays, packet drops, and retransmissions that are generally dependent upon changes in transmitter/receiver locations. Each wireless environment is characterized by a model of the communication channel that characterizes transmission effects based on the number of competing transmitters in the environment, which is dynamically determined based on the location of each node in the environment. Additionally, the location of nodes is used to simulate the effects of 'hidden nodes', nodes that are unknown to a transmitting node but can interfere with the reception of transmissions at a receiving node. Each device/node model in the wireless environment preferably accesses the same model of the communication channel, thereby minimizing the amount of detail required at each device model.

44 Claims, 4 Drawing Sheets

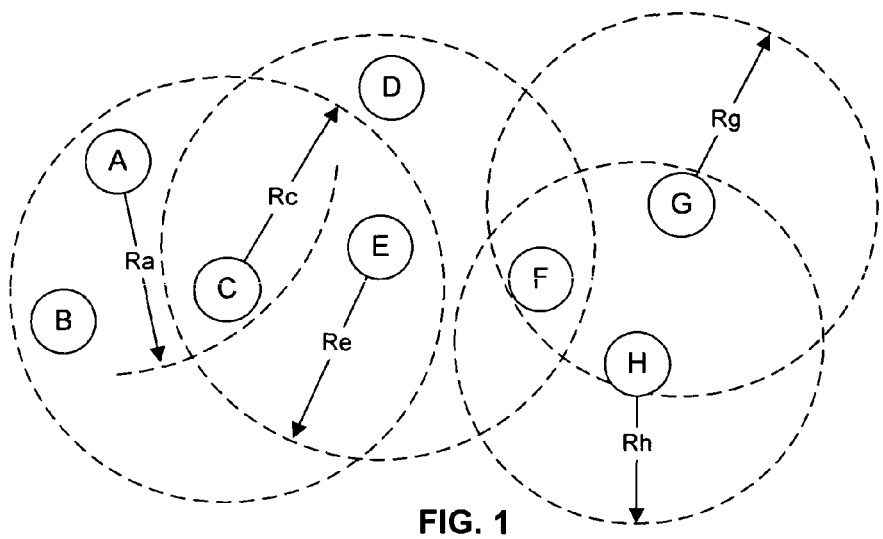
FIG. 1
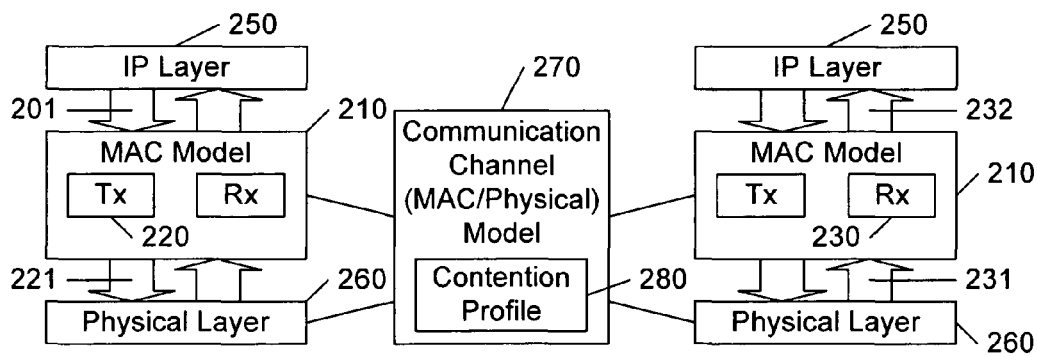
FIG. 2A
| #Contenders | Network Throughput | Unicast P(Drop) | Broadcast P(Drop) | Retransmission Rate |
|---|---|---|---|---|
| 1 | 800 | 0 | 0 | 0 |
| 2 | 784 | 0 | 0 | 0 |
| 3 | 768 | 0.8E-5 | 0 | 0.06 |
| 4 | 736 | 1.4E-5 | 0.1 | 0.11 |
| ⋮ | | | 280 | |
| >30 | 400 | 8.3E-5 | 0.7 | 0.50 |
FIG. 2B

WIRELESS MAC AND LINK-LAYER SIMULATION MODELING

This application claims the benefit of U.S. Provisional Patent Application Ser. No. 60/707,248, filed 11 Aug. 2005.

BACKGROUND AND SUMMARY OF THE INVENTION

This invention relates to the field of network simulation, and in particular to the modeling of MAC (media access control) and PHY (physical) layer interfaces for wireless devices.

The use of wireless devices continues to grow and wireless networks have entered the realm of commercial communication systems. Traditional communication and information processing issues regarding configuration control and communications efficiency, which had heretofore been generally limited to wired networks, are now being addressed for managing wireless networks.

One of the fundamental tools available to a network manager for network planning, diagnostics, and control is a network simulator. The interconnection of elements forming a network is modeled, and hypothetical traffic patterns are provided to the model to determine and/or estimate how the modeled network will perform under these traffic conditions. Alternative interconnections and/or configurations of the elements can also be modeled, to perform a "what-if?" analysis, or to diagnose real or assumed problems in the network.

Conventional system simulators typically use fairly primitive models of wireless devices or wireless sub-networks, because the likelihood of a wireless device or sub-network having an impact or effect on the performance of traditional mainstream networks is minimal. When accurate simulation of wireless network performance is required, the device models are complex and difficult to parameterize, because the number of factors that can affect the communication of messages in a wireless network are substantially greater than those that might affect a similarly structured wired network. Complex models provide more fidelity in the results, at the cost of slowing simulation performance. Additionally, because wireless devices are typically mobile devices, a wireless network's dynamic structure is generally too fluid for static modeling in a conventional network simulator.

It is an objective of this invention to provide a method and system that accurately models the performance of wireless networks. It is a further objective of this invention to provide a method and system that accurately models the propagation of packets between and among mobile wireless devices. It is a further objective of this invention to provide a method of modeling and simulating wireless devices that minimizes the parameters required at each wireless device. It is a further objective of this invention to provide a framework that can be adapted to simulate the behavior of different MAC protocols under different physical layer characteristics. It is a further objective to achieve acceptable simulation performance compared to the real time performance of the actual wireless networks.

These objectives, and others, are achieved by a simulation model that effectively emulates a variety of phenomena that affect transmissions via a wireless media. Such phenomena include media access contention delays, packet drops, and changes in transmission/reception locations. Each wireless environment is characterized by a model that characterizes transmission effects based on the number of competing transmitters in the environment. Because the wireless devices may be mobile, the number of competing transmitters is dynamically determined based on the location of each device in the environment and its associated traffic activity. Additionally, the location of devices is used to model the effects of 'hidden nodes', nodes that are unknown to a transmitter but can interfere with the reception of transmissions at a receiver. In a preferred embodiment, each device model in the wireless environment accesses the same model that characterizes the environment, thereby minimizing the amount of detail required at each device model.

BRIEF DESCRIPTION OF THE DRAWINGS

The invention is explained in further detail, and by way of example, with reference to the accompanying drawings wherein:

FIG. 1 illustrates an example wireless network environment.

FIGS. 2A-2B illustrate an example model of a network environment with a contention profile in accordance with an aspect of this invention.

Throughout the drawings, the same reference numerals indicate similar or corresponding features or functions. The drawings are included for illustrative purposes and are not intended to limit the scope of the invention.

DETAILED DESCRIPTION

Figure 3:
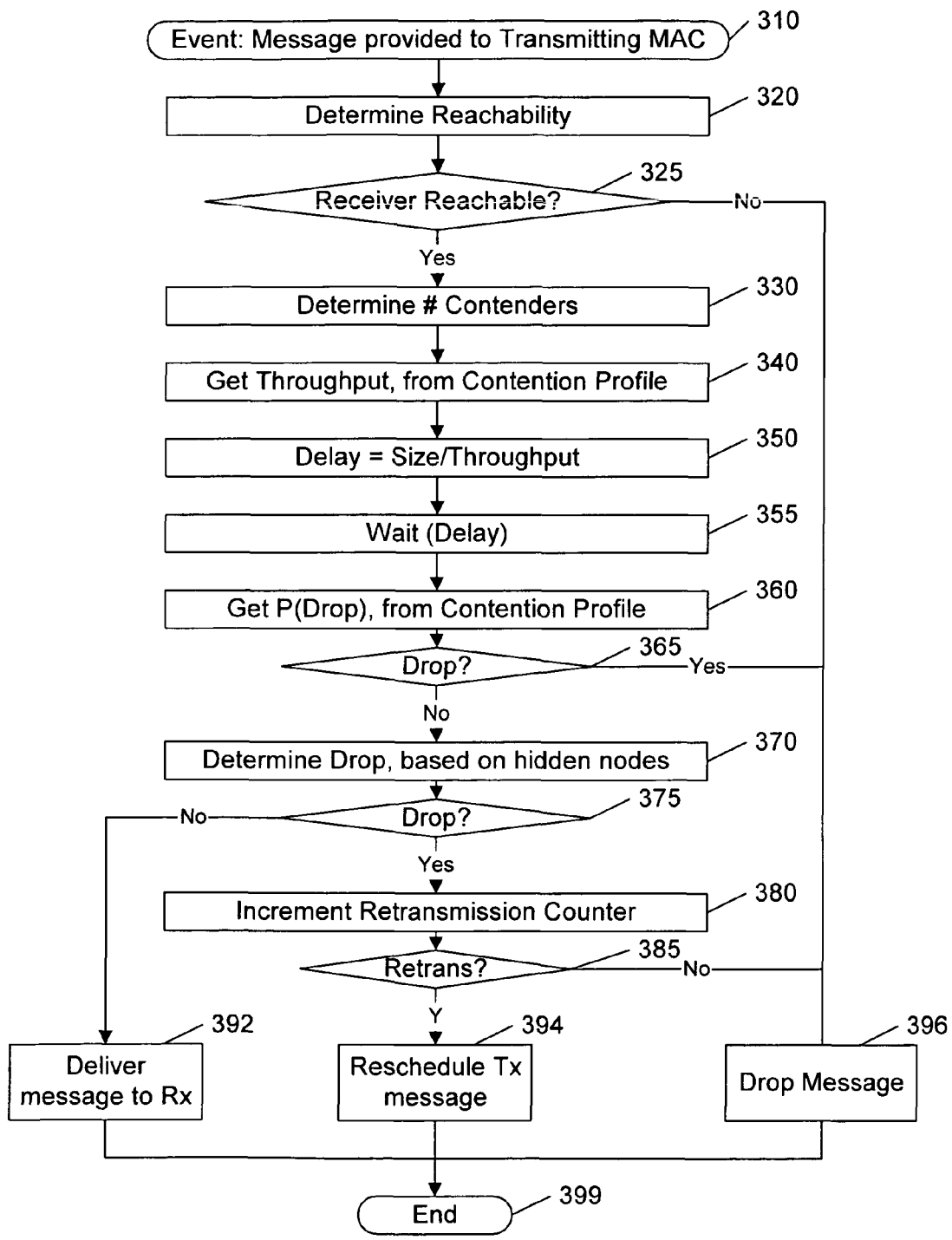
FIG. 3 illustrates an example flow diagram of a simulation model for a wireless node in accordance with an aspect of this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention relates to a method and system for simulating events, using a model of a communications network, to determine or estimate how an actual network may perform during the occurrence of actual events. For ease of explanation and understanding, however, the following description of the simulation of events is cast in terms of actual events, except as specifically noted. That is, for example, a phrase such as "the message is sent from the transmitter to the receiver" may be used herein in lieu of the more cumbersome phrase of "the model of the transmitter effects the simulation of communication of the message from an actual transmitter to an actual receiver by notifying the model of the receiver of the occurrence of this simulated communication". In like manner, temporal terms, such as "event", and "time", generally refer to an artificial time frame used with a simulator for modeling actual events and real time, except as otherwise noted.

FIG. 1 illustrates an example wireless network environment comprising a plurality of wireless nodes A-H, some of which may be mobile, and some stationary at a fixed location. Each node exhibits a certain transmission range Ri, which is primarily determined by the characteristics of its transmitter, such as power, antenna gain, and so on. In FIG. 1, for example, the transmission range Re of node E includes nodes C, D, and F; the transmission range Rg of node G includes nodes F and H; etc.

When node E has a message to transmit, it must contend with the possibility that nodes D, C, or F may also have messages to transmit. Similarly, nodes D, C, and F, must content with the possibility that node E has a message to transmit. Depending upon the particular protocol used in the network, this contention will produce a certain amount of inefficiency, commonly termed overhead. In one protocol, for example, a transmitter may be configured to wait a random amount of time before attempting to start a transmission, then "back off" if another transmitter is already transmitting; in another protocol, the transmitter may be configured to reserve one or more timeslots for transmitting the message; and so on. This delay-and-back-off process, or the reserve-a-timeslot process, consumes time that could have been spent transmitting the message if the contention were not present. As the number of contenders increase, the amount of time spent dealing with the contentions generally increases.

In accordance with this invention, each node in a network is simulated via the use of a "MAC" (Media Access Control) model 210, as illustrated in FIG. 2A. The MAC model 210 simulates the behavior of each source/transmit node as a message 201 is presented to the node from a higher level 250 in the communication protocol (the IP layer) for transmission 221 by a transmitter Tx 220 at the node, via a lower level 260 in the communication protocol (the Physical layer) to a corresponding MAC model 210 of a destination/receive node. The MAC model 210 also simulates the behavior of the destination node as each message 231 is received by a receiver Rx 230 from the lower level 260 and provided 232 to the upper level 250 of the protocol.

In order to properly model the communication channel at the physical layer interface at each node, each MAC model 210 preferably models the throughput effects of contention for the communication channel, including delays caused by retransmissions due to interference and collisions, listen-and-backoff, unavailability of slot allocations, and so on. Similarly, the occurrence of failed/dropped transmissions due to buffer overflows, excessive retransmission attempts, and unintended collisions are preferably modeled in the MAC model 210 as well. Adding to the complexity, many of these effects are generally dependent upon the location of the nodes relative to each other, and the MAC model 210 of this invention preferably accounts for each node's location.

An aspect of this invention is premised on the observation that the inefficiency incurred by each node due to contention is endemic to the environment, and not, per se, related to the individual transmitters. In like manner, other characteristics, such as the likelihood of a transmission being 'dropped' (i.e. inexplicably fail to be received), and/or the overhead associated with retransmitting messages, and so on, are more characteristic of the environment than the individual transmitters. In accordance with this aspect of the invention, each MAC model 210 accesses a common model 270 of the communication channel at the physical layer 260 that includes a set of parameters 280 that characterize the environment in which the nodes using this channel are operating; in this manner, each MAC model 210 need not contain the details associated with the communication channel, yet has access to these details, or the effects of these details, to effectively model the interface with the physical layer. Preferably, these parameters are provided as a function of the contention for each communication channel within the environment.

FIG. 2B illustrates an example set of parameters 280 that are organized as a "contention table" that characterizes a wireless network environment in accordance with an aspect of this invention. In this example, the contention table 280 includes parameters of throughput 282, probabilities of drop 283, 284, and the number of retransmissions 285, each of which are dependent upon the number of contenders 281 that a transmitter encounters in this characterized physical environment. In this example, the overall communication channel throughput is nominally 800 kbps. If there is only one transmitter contending for the channel, that transmitter will be able to use substantially all of the available throughput, or 800 kbps. But, if there are two transmitters contending for the channel, some overhead (2% in this example) is incurred, thereby reducing the network throughput to 784 kbps. Instead of each transmitter having half of the original throughput (400 kbps), they will each have only 392 kbps available. In like manner, if there are three contenders, the overhead increases (4%), and these transmitters share 768 kbps (768 kbps/3 contenders =256 kbps per contender); and so on. It is significant to note that this framework can also be used to model environments that do not require any contention at all, wherein, for example, all transmitters have a fixed resource allocation. This can be easily achieved, for example, by assuming a constant number of contenders. The data in contention table 280 is typically dependent upon protocol, packet size, and physical characteristics. Different wireless networks environments are characterized by entries in the contention table.

Although a table of values is used in the example of FIG. 2, one of ordinary skill in the art will recognize that some or all of the characterizing parameters may be specified using an algorithm or other technique that associates a value of the parameter as a function of the number of contenders for the communication channel. The term "contention profile" is used hereinafter for ease of reference, and includes any of these alternative representations, regardless of whether a table is explicitly created. Preferably, the model of the communication channel 270 includes one or more function or subroutine calls that are accessed by the MAC model 210, and are configured to return one or more parameter values (such as throughput 282, probability of drop 283, 284, etc.) based on one or more input parameter values that include a measure of contention for the physical channel (such as the nominal number of contenders 281). The particular internal structure of the model 270 is immaterial to this aspect of the invention.

As illustrated in FIG. 2B, the contention profile 280 includes a parameter 283, 284 that can be used to model the loss, or drop, of a transmission before it reaches its intended receiver. The intended receiver can be a single receiver (a unicast transmission), or multiple receivers (a broadcast transmission). In the example of FIG. 2B, the probability of a drop is specified for both unicast 283 or broadcast transmissions 284; one of ordinary skill in the art will recognize that this probability of dropping the transmission can be based on the actual number of intended recipients as specified in the contention table 280. The retransmission parameter 285 in the example contention profile is a measure of the average number of retransmissions per packet, discussed further below with respect to FIG. 5.

FIG. 3 illustrates an example flow diagram of a MAC model 210 that models the substantial elements of performance (throughput and dropped transmissions) in a mobile network of wireless nodes. Typically, simulators are event-driven, and the example flow diagram illustrates the event of a message (201 in FIG. 2A) being presented to a node, for transmission (221) via a physical media, at 310. This flow diagram illustrates the flow from the receipt of the message by a transmitter Tx at the source node to the delivery of the message to a receiver at the destination node. One of ordinary skill in the art will recognize that different simulators may be structured differently, and may distinguish events differently; for example, a simulator may be structured to model the receipt of the message for transmission and the delivery of the message to the receiver as two different events. The example of FIG. 3 is provided for ease of illustration, and one of ordinary skill in the art will recognize that the principles of this invention are not constrained to this particular partitioning of events and flow.

At 320, the "reachability" of the node is determined, based on the range of the node's transmitter Tx, and the location of each receiver Rx in the network. In a preferred embodiment, the reachability of each node is stored in a reachability matrix that contains a value of "true"/"false" (1/0) for each receiver that is reachable/unreachable by each transmitter. To avoid redundant calculations, this reachability matrix is updated only when a transmitter or receiver moves by a threshold amount, as discussed further below with respect to FIG. 4.

Figure 4:
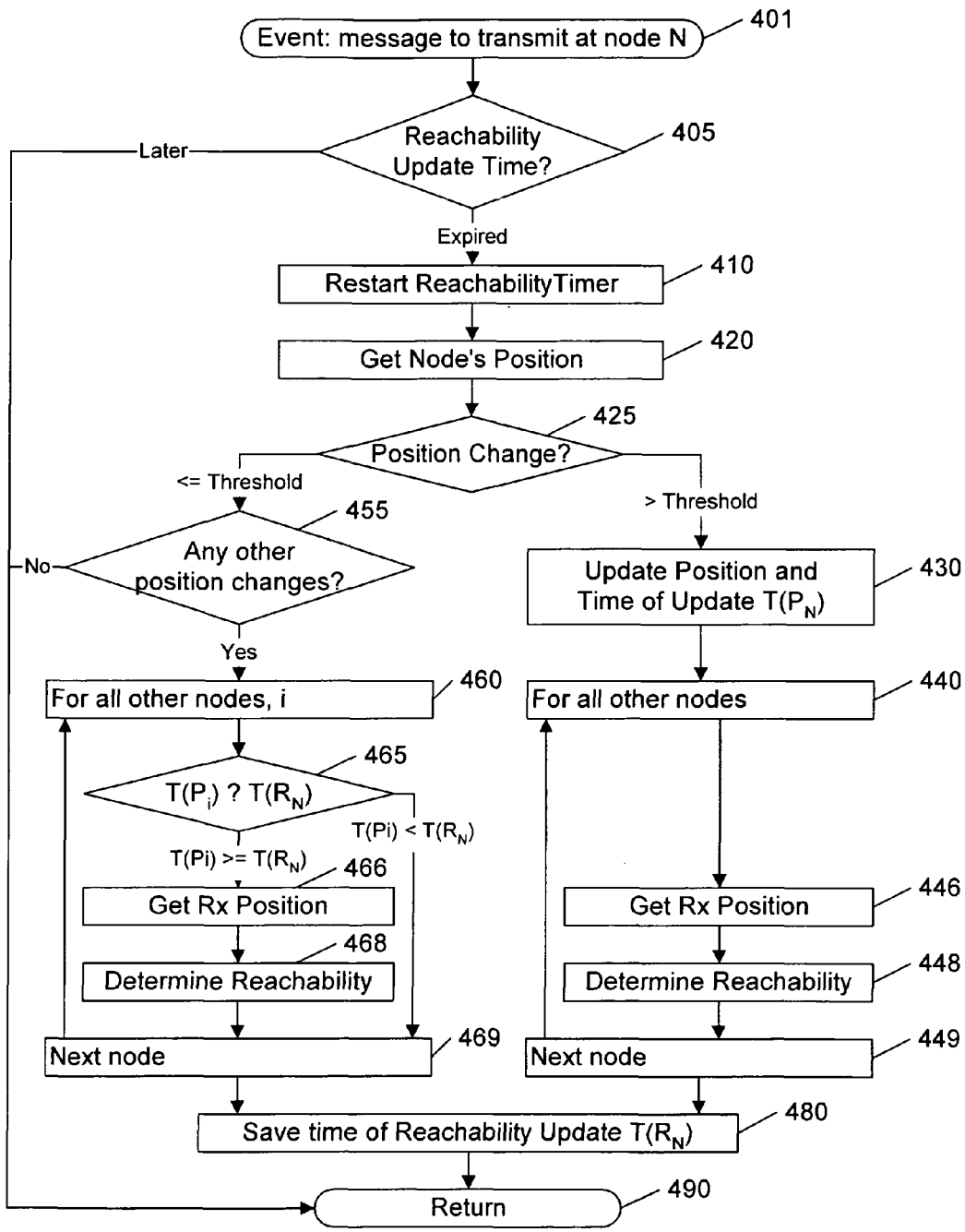
FIG. 4 illustrates an example flow diagram of a process for updating the reachability characteristics of transmitters in a wireless network environment in accordance with an aspect of this invention.

FIG. 4 illustrates an example flow diagram for determining whether to update each node's reachability. Preferably, a reachability timer is used to reduce the frequency of reachability updates, on the assumption that significant changes in reachability, which can only occur if one or more nodes change locations, require a substantial amount of time, relative to the time-scale of packet transmissions. Each time a reachability update is performed, this reachability timer is restarted, and a subsequent reachability update will not be performed until the minimum update period has elapsed.

At 405, if the reachability update time has not yet been occurred, the reachability update process 410-480 is bypassed, and the message is processed directly (i.e. control is returned to the process of FIG. 3) at 490. If the minimum reachability update period has elapsed, at 405, the transmit node's position is determined, at 420, and the change from its prior position is compared to a threshold distance, at 425.

If, at 425, the transmitter's position has changed by more than the threshold amount, the position is updated, and the time of this position update $T(P_N)$ is recorded, at 430. Thereafter, the loop 440-449 determines each other node's position 446, and the reachability of the receiver at the node is determined 448, based on the distance between the transmitter and the receiver relative to the transmitter's range. If the Euclidean distance between the transmitter and a receiver is less than the range of the transmitter, the receiver is "reachable" by the transmitter. In a preferred embodiment, to avoid having to perform a square-root function, the square of the Euclidean distance ($x^2+y^2+z^2$) is compared to the square of the range ($R^2$); also, the determination of the square of the Euclidean distance is avoided if any of the individual distances x, y, or z is larger than the range. Other efficiencies may also be gained, such as eliminating the z coordinate if it can be assumed a priori that the difference in elevation is within the same range as the imprecision of the range estimate, and so on. The time of performing this update to the reachability of this transmitter $T(R_N)$ is stored, at 480, and the message is processed, at 490.

If, at 425, the transmitter's position has not changed by more than the threshold amount, a determination is made as to whether any other node's position has changed since the last reachability update. This determination can be made by maintaining the latest position update time of any node, and comparing this time $T(P_i)$ to the current node's reachability update time $T(R_N)$. If at least one other node's position has changed since the current node's reachability has been updated, all nodes are processed as potential receivers (Rx) via the loop 460-469. Each other node's position update time $T(P_i)$ is compared to the current node's reachability update time $T(R_N)$. If, at 465, the other node has changed position since this node's reachability has been updated, the other node's position is determined, at 466, and the reachability of this other node by the current node is determined, at 468, based on the distance between this node's transmitter and the other node's receiver relative to the transmitter's range, as detailed above. The time of performing this update to the reachability of this transmitter $T(R_N)$ is stored, at 480, and the message is processed, at 490.

Returning to FIG. 3, as noted above, by determining the reachability of nodes only when the nodes change location as illustrated in FIG. 4, the efficiency of the "determine reachability" block 320 is substantially increased, because the block 320 need only access the reachability matrix to determine whether a given receiver is reachable by a given transmitter.

If, at 325, the intended receiver is not reachable, the message is not further processed for transmission at this time. Otherwise, at 330, the number of contenders is determined, and based on the number of contenders, the available throughput for this transmitter is determined, at 340, using data provided by the model of the communication channel 270 of FIG. 2A, such as data from the contention profile 280 of FIG. 2B. Note that the number of contenders is used in this example as the index 281 to the contention profile 280, but other measures of contention besides the actual number of contenders may be used, as discussed further below.

Any of a variety of techniques can be used to determine the measure of contention, based on the required degree of simulation realism. That is, different degrees of 'realism' can be achieved in a simulator, depending upon the user's purpose for performing the simulation and/or the context in which the simulation model is being used. The level of simulation detail substantially affects the time required to perform the simulation, and options are provided to avoid the time required to simulate unnecessary details. For example, a user may perform a simulation to determine the performance of a corporate network along a few key routes, and may not need to incur the time required to accurately simulate each and every transmission within each sub-network. On the other hand, a network administrator who is trying to debug a particular performance problem may need to investigate the performance at a very detailed level.

If the internal dynamics of the wireless network are not expected to significantly affect the analysis results, the measure of contention can be set at a fixed value (such as an average number of contenders) at the start of the simulation, to avoid having to dynamically determine the measure of contention with each transmission. At a next level of detail, the number of nodes within range of the transmitter, based on the reachability determination, at 320, can be used as a measure of contention. In a very busy network, the nominal number of contenders 281 for indexing the contention profile 280 can be set equal to the number of reachable nodes; in a less busy network, the number of contenders 281 can be set equal to a given proportion of the number of reachable nodes; in a dynamic network, the number of contenders 281 can be based on a non-linear relationship to the number of reachable nodes; and so on. At a further level of detail, the measure of contention can be based on the actual number of contenders (i.e. nodes with messages to send) within range of the transmitter. Optionally, these alternative techniques for determining the nominal number of contenders 281 for accessing the contention table 280 can be included in the model of the communication channel 270, such that, for example, the input parameter to the model 270 can be the number of nodes within range of the transmitter, and the determination of the nominal number of contenders 281 based on the degree of realism desired can internal to the model 270.

At 350, the packet service delay is determined. This delay is the delay that the message incurs at the transmitter, and is determined based on the effective transmission throughput (throughput based on contention and overhead) and the length of the message. The delay incurred by the message is equal to the size of the message divided by the allocated throughput. At 355, the delay duration is simulated at the MAC model (210 of FIG. 2). One of ordinary skill in the art will recognize that this delay can be simulated by scheduling the end of the delay period as an event, and having the simulation process return to the MAC model at this point when the event occurs.

The thus-far described process of FIG. 3 addresses the transmission of messages within a given network environment from the IP layer to the physical layer, via a model 210 of a transmitter TX and a model 270 of the environment. Successful communications, however, also requires successful reception of the message from the physical layer to the receiver Rx. As illustrated in FIG. 3, the loss of a message at the receiver is also modeled in the MAC model that transmits the message. As noted above, one of ordinary skill in the art will recognize that different structures of the simulator and MAC model could be used. For example, the source node's MAC model could be structured to communicate a "message transmitted" event to each destination node's MAC model, and the destination node's MAC model could be configured to determine whether the transmitted message is dropped at the destination node. Also alternatively, some or all of the determinations of whether the transmitted message is dropped/will be dropped can be determined before incurring the delay at block 335, if the desired level of simulation detail does not require a simulation of such delays.

The primary cause of loss of communications at a receiver is interference, when two or more transmitters simultaneously transmit on the same communication channel. As discussed above, most protocols attempt to minimize such interference, by imposing a listen-then-back-off contention policy, or by allocating dedicated time-slots to each transmitter. However, there remains a finite probability that a collision will occur despite these precautions, and generally the probability of such collisions is dependent upon the number of contenders for the communication channel. The example contention profile of FIG. 2B includes the likelihood of such interference among the contenders for the channel causing a message to be "dropped"; i.e. not communicated to the receiver, or not properly received by the receiver, or in columns 283, 284. For ease of understanding, the term "drop" and "non-communication" are used synonymously herein to indicate the lack of receipt of a transmitted message at a receiver, regardless of cause.

At 360 of FIG. 3, the probability of a message being dropped is determined from the model of the communication channel (270 of FIG. 2A) that contains the contention profile, based on the number of contenders, or the number of reachable nodes, and based on whether the transmission is directed to a single receiver (unicast) or multiple receivers (broadcast). At 365, a determination is made as to whether this particular message is dropped, based on the probability of a message being dropped, using conventional simulation techniques, such as generating a pseudo-random number and choosing whether to drop the message based on the probability of generating a number within a given range. Preferably, for ease of programming, this drop-determination 365 is included in the model of the communication channel, such that the model returns a "drop/no-drop" response, rather than the actual probability parameter.

The aforementioned probability of dropping a message is based on an assumption that all transmitters are properly adhering to the contention rules of the protocol being used. However, such rules of protocol require that each transmitter is aware of each other transmitter, or, in the case of time-slot allocations, that a central controller is aware of each transmitter within range of each receiver. In many cases, however, such total knowledge is not available, and interference is caused by the occurrence of nodes that are unknown to the transmitter, or unknown to the controller of the transmitter. Such nodes are commonly termed "hidden nodes", and the unintended interference caused by simultaneous transmissions by such nodes is termed "hidden node interference".

In the example of FIG. 1, for example, nodes E and G are "hidden" from each other, because neither is in range of the other. However, node F is in range of both nodes E and G, and thus is likely to experience hidden node interference due to simultaneous transmissions from nodes E and G. In a listen-and-back-off protocol, node E will listen for transmissions before it transmits, but it will not hear transmissions from node G, and thus will transmit independent of node G. Nodes C and D will not be affected by simultaneous transmissions from E and G, but node F will be unable to reliably receive from either node during such simultaneous communications. In like manner, if node D is a controller of time-slots that are allocated to nodes C, D, E, and F, node D may be unaware of node H, and transmissions from node H will likely interfere with communications to node F, and possibly node E.

Figure 5A:
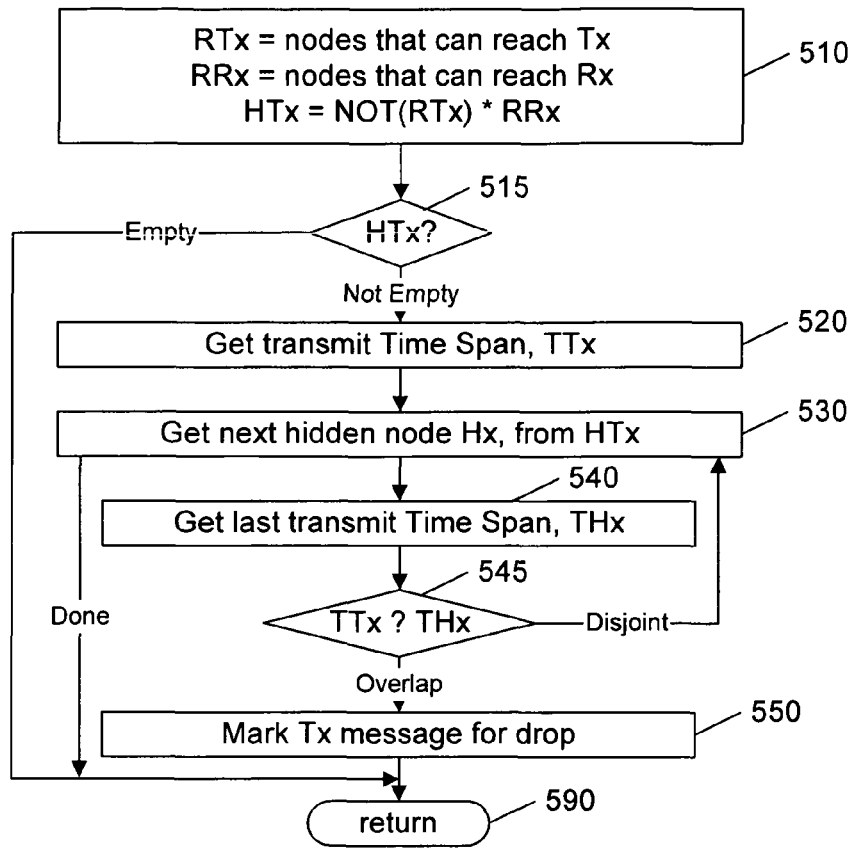
FIGS. 5A-5B illustrate an example flow diagram of a process for modeling hidden node interference in accordance with an aspect of this invention.
Figure 5B:
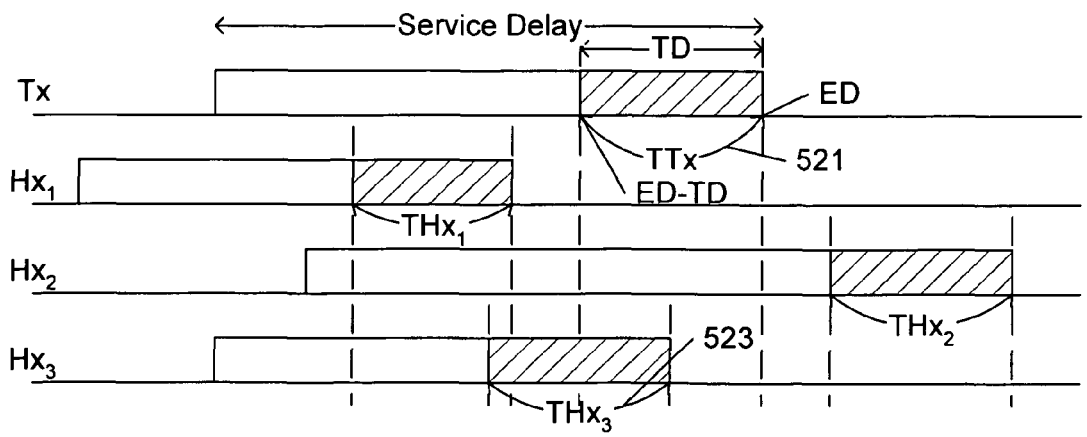

FIG. 5A illustrates an example flow diagram for modeling hidden-node interference between the current transmitter Tx and the nodes hidden from Tx that can reach a given receiver Rx, to determine whether messages to receiver Rx are dropped because of this interference. FIG. 5B illustrates an example timing diagram of transmissions from Tx and hidden nodes $Hx_{1-3}$.

At 510, the nodes RTx that can reach the transmitter Tx are determined, using the aforementioned reachability matrix. These nodes RTx are the nodes that the transmitter Tx will be aware of, and for which the transmitter Tx will use the rules of protocol to avoid intentional interference due to collisions of the radio frames. If the range of all the transmitters is equal, the nodes that can reach Tx are the same nodes that are reachable by Tx; if not, the reachability matrix is accessed via the orthogonal coordinate, wherein the transmitter Tx is addressed as a receiver to determine which transmitters include Tx within their reach.

Also at 510, the nodes RRx that can reach the receiver Rx are determined, again using the reachability matrix, to reduce computational complexity. These nodes RRx are the nodes whose simultaneous transmissions will interfere with each other at the receiver Rx. Optionally, because a transmitter's interference range is greater than its communication range, the reachability matrix may be structured to contain two entries per receiver, a first "reachable/ unreachable" entry based on the communication range of the transmitter, and a second "interfering/non-interfering" entry based on the interference range of the transmitter, and this second entry would be used for determine which nodes RRx can reach the receiver Rx with their interference. For example, with regard to the example of FIG. 1, node H would likely be included as a node that can reach node E with interference (RRx); but, because node E is beyond the communication range Rh of node H, node H would not be included as a node that can reach node E with a reliable transmission (Not(RTx)).

The hidden nodes HTx relative to transmitter Tx and receiver Rx are the nodes that can reach receiver Rx (RRx) but cannot reliably receive from transmitter Tx (Not(RTx)), because transmitter Tx will be unaware (Not(RTx)) of transmissions from these nodes HTx, and may transmit while transmissions (or interference) from one or more of these nodes HTx are being received by Rx (RRx).

If, at 515, there are no hidden nodes, control returns to the process of FIG. 3, at 590. Otherwise, the time of the transmission from the transmitter Tx is determined, at 520. The time of transmission can be assumed to be the entire packet service delay, as determined at 350 of FIG. 3, but in a preferred embodiment, the packet service delay is assumed to comprise a contention delay, during which other transmitters have access to the channel, and a physical-channel transmission duration, during which collisions may occur. That is, for example, if two transmitters are contending for channel access, each transmitter actually transmits on the physical-channel less than half the time. Additionally, the channel throughput rate is typically less than the actual physical-channel data rate, because the channel throughput rate generally includes the overhead associated with communicating acknowledgements and other 'handshaking' tasks associated with a given protocol, including the time required to retransmit messages when an acknowledgement is not received, and so on. In an example embodiment, the physical-channel transmission duration can be determined as:

TD=((Size)*(1+Retrans)+PChanOverhead+AckOverhead)/PChanRate, where TD is the transmission duration, Size is the message size, Retrans is the overhead associated with retransmissions (285 in FIG. 2B), PChanOverhead is the overhead associated with the physical channel, and AckOverhead is the overhead associated with communicating acknowledgements. One of ordinary skill in the art will recognize that other techniques may be used to determine an allocation of the packet service delay to the actual transmission duration. For example, in lieu of the retransmission factor 285 in the contention profile of FIG. 2, a factor may be provided that merely indicates the proportion of the packet service delay that is attributable to the transmission duration. For ease of processing, the entirety of the determined transmission duration is assumed to occur at the end of the packet service delay period, as illustrated in the timing diagrams of FIG. 5B (i.e. at the end of the wait period of block 355 in FIG. 3). If the time of the end of the packet service delay period is defined as ED (=transmission start time+packet service delay), and the transmit duration is defined as TD, the time span TTx 521 during which the physical-channel transmission occurs is defined as the period from ED-TD to ED.

The blocks 530-550 determine if at least one hidden node is transmitting on the physical-channel during the determined physical-channel transmit time span TTx. At 530, each subsequent hidden node Hx identified in HTx is accessed until either all the hidden nodes have been processed (the "done" arrow), or until an interfering hidden node is detected, as detailed below.

The physical-channel transmit time span THx for the hidden node Hx is determined, at 540, similar to the determination of the physical-channel time span TTx at 520, discussed above. The transmit time spans THx are stored in a matrix and each transmitter updates its corresponding THx value based on its transmission activity. The transmit time spans $THx_{1-3}$ for three hidden models $Hx_{1-3}$ are illustrated in FIG. 5B.

If, at 545, the transmitter's transmit time span overlaps with the hidden node's transmit time span THx, such as illustrated by TTx 521 and $THx_3$ 523 in FIG. 5B, a collision will occur at the receiver Rx. At 550, the transmission from the transmitter Tx is marked as being dropped, and the hidden node processing ends, at 590. Once it is determined that the transmitter's message will be interfered with by at least one hidden node, additional processing compared to other hidden nodes is not required. Also, it is not necessary to determine whether the transmissions from the hidden nodes Hx should be dropped during the processing of the transmission from this transmitter Tx, because all nodes undergo this same check for hidden-node interference (as a transmitter Tx) for each of their transmissions.

Upon completion of the process of FIG. 5A, control returns to the process of FIG. 3.

If, at 375 in FIG. 3, the message has not been marked for drop due to hidden-node interference, the transmission is delivered to the receiver, at 392, typically by scheduling or triggering a 'message received' event for processing at the receiver Rx. Otherwise, a repeat transmission is attempted. To avoid continual retransmission attempts, a retransmission counter is incremented with each attempt, and this count is compared to a threshold at 385. If the current retransmission count for this message is below the threshold, the message is rescheduled for transmission, at 394; otherwise it is dropped, at 396. The process ends, at 399, to await another message arrival event, at 310.

It is significant to note that via this invention, each of the wireless nodes in a given environment/contention domain is simulated using a model of the communication channel 270 that is common to all of the transmitters in the same environment. In this manner, the modeling 210 of each wireless node is substantially simplified, by eliminating the environmental effects from the individual transmitter models 210, and by characterizing the environment effects 280 based on the number of nodes contending for the channel.

It is also significant to also note that this invention provides a generic and flexible framework for simulating various different wireless communication technologies, including, but not limited to Wireless LAN, WiMAX, satellite, TDMA, dedicated wireless links, and so on.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method of simulating communications among a plurality of nodes via a communication channel, comprising:

defining a model of the communication channel that is common to the plurality of nodes and is configured to receive a measure of contention and to provide therefrom a throughput measure, simulating, on a simulation system, receipt of messages at a source node, for transmission to a destination node, determining, on the simulation system, the measure of contention for the communication channel, determining, on the simulation system, a service delay based on the model of the communication channel and the measure of contention, simulating, on the simulation system, communication of at least one message from the transmitter to the receiver via the communication channel at a time of completion of transmission that depends upon the service delay, wherein the communication channel is characterized as having a total available bandwidth that decreases with increased contention, and the model is configured to provide the throughput measure based on the total available bandwidth, which is determined based on the measure of contention.

2. The method of claim 1, wherein the model of the communication channel includes values of a throughput parameter that are dependent upon a number of contenders for the communication channel, and determining the service delay is based on a mapping of the measure of channel contention to the number of contenders to determine the corresponding throughput measure upon which the service delay depends.

3. The method of claim 2, wherein the service delay is based upon a size of each message divided by the throughput measure.

4. The method of claim 2, wherein the model of the communication channel is configured to determine a likelihood of dropping each message based on the measure of contention; the method including:

determining the likelihood of dropping each message, based on the model of the communication channel and the measure of contention, and simulating non-communication of at least one message from the transmitter to the receiver based on the likelihood of dropping the message.

5. The method of claim 4, wherein the likelihood of dropping each message is based on a number of contenders within a contention domain associated with the communication channel.

6. The method of claim 5, wherein the contention domain includes each other node that can reach the source node during a giving time period.

7. The method of claim 5, including determining a relation between the likelihood of dropping each message and the number of contenders based on at least one of:

empirical evidence, measurements based on actual communications, and measurements based on other simulations of communication behavior in a single contention domain.

8. The method of claim 2, including determining a number of other nodes reachable by the source node, and wherein the measure of contention is based on the number of other nodes reachable by the source node.

9. The method of claim 1, including determining a number of other nodes reachable by the source node, and wherein the measure of contention is based on the number of other nodes reachable by the source node.

10. The method of claim 9, wherein the model of the communication channel is configured to determine a likelihood of dropping each message based on the measure of contention; the method including:

determining the likelihood of dropping each message, based on the model of the communication channel and the measure of contention, and simulating non-communication of at least one message from the transmitter to the receiver based on the likelihood of dropping the message.

11. The method of claim 1, including simulating communication of other messages on the communication channel from other transmitters, and simulating non-communication of at least one message from the transmitter to the receiver based on a first time interval of communication of the at least one message from the transmitter to the receiver and a second time interval of the communication of the other messages on the communication channel.

12. The method of claim 11, wherein the first time interval occurs at an end of the service delay.

13. The method of claim 12, wherein the first time interval is substantially shorter than the service delay.

14. The method of claim 13, wherein:

the first time interval is based on a communication rate of the communication channel, and the throughput measure includes a throughput rate of the communication channel.

15. The method of claim 11, wherein the model of the communication channel includes:

a first parameter that facilitates the determination of the service delay and a second parameter that facilitates determination of the first time interval.

16. The method of claim 15, including determining a relation between the throughput measure and the contention measure based on at least one of:

empirical evidence, measurements based on actual communications, and measurements based on other simulations of communication behavior in a single contention domain.

17. The method of claim 15, wherein the first parameter includes the throughput measure that is based on the measure of contention.

18. The method of claim 17, wherein the second parameter includes an overhead that is based on the measure of contention.

19. The method of claim 1, including determining a location associated with the source node, and wherein the measure of contention is based on the location associated with the source node.

20. The method of claim 1, including determining a distance between the source node and each of the plurality of nodes, and wherein the measure of contention is based on the distance between the source node and each other node of the plurality of nodes.

21. The method of claim 20, including determining a change of location of at least one of the plurality of nodes, and updating the set of reachable nodes if the change of location exceeds a given distance threshold.

22. The method of claim 21, including recording a time of occurrence of the updating of the set of reachable nodes for the source node, and precluding a subsequent update of the set of reachable nodes for the source node based on the time of occurrence of the updating.

23. The method of claim 1, including:
determining a first set of distances between the source node and each other node of the plurality of nodes,
determining a second set of distances between the destination node and each other node of the plurality of nodes,
identifying a set of hidden nodes, which are nodes that are not within a range of the source node, but able to interfere with the destination node based on the first and second set of distances, and
simulating non-communication of at least one message from the transmitter to the receiver based the set of hidden nodes.

24. The method of claim 23, including simulating communication of other messages on the communication channel from the hidden nodes transmitters, and wherein the simulating of non-communication of at least one message from the transmitter to the receiver is based on a first time interval of communication of the at least one message from the transmitter to the receiver and a second time interval of the communication of the other messages on the communication channel.

25. The method of claim 24, wherein the model of the communication channel includes:
a first parameter that facilitates the determination of the service delay and
a second parameter that facilitates determination of the first time interval.

26. The method of claim 1, wherein the simulating of communications from each node of the plurality of nodes includes determining a service delay based on the same model of the communication channel.

27. A method of simulating communications among a plurality of nodes via a communication channel, comprising:
defining a model of a MAC layer for each of the plurality of nodes that facilitates modeling of a dynamic state of the communication channel that varies during simulation of the communications;
defining a model of the communication channel that is common to the plurality of nodes and includes a channel state variable as an input parameter and provides a throughput measure as an output parameter;
simulating, on a simulation system, communication of application messages from source nodes to destination nodes by executing the model of the MAC layer at each source node for each of the application messages;
wherein:
executing the model of the MAC layer for each message includes:
determining a current state of the communication channel,
using the model of the communication channel to determine a current throughput measure based on the current state of the communication channel, the communication channel being characterized as having a total available bandwidth that decreases with increased contention, and the model being configured to provide the throughput measure based on the total available bandwidth, which is determined based on the current state of the communication channel, and
determining a service delay based on the current throughput measure; and
simulating, on the simulation system, the communication of the message is based on the service delay.

28. The method of claim 27, wherein the state of the communication channel is dependent upon effects of a physical layer.

29. The method of claim 28, wherein the effects of the physical layer are dependent upon locations of some or all of the source and destination nodes.

30. The method of claim 27, wherein the state of the communication channel includes a number of nodes contending for the communication channel.

31. The method of claim 27, wherein the model of the communication channel also provides one or more of the following as other output parameters that are based on the state of the channel:
a likelihood of dropping messages, and
a retransmission rate, and
simulating the communication of the messages is based on one or both of these other output parameters.

32. The method of claim 31, wherein the state of the communication channel includes a number of nodes contending for the communication channel.

33. The method of claim 27, wherein the model of the communication channel is based on at least one of:
empirical evidence,
measurements based on actual communications, and
measurements based on other simulations of communication behavior in a single contention domain.

34. The method of claim 27, wherein executing the model of the MAC layer for each message includes determining each other node that can reach the source node during a giving time period.

35. The method of claim 27, wherein:
executing the model of the MAC layer for each message from each source node to each destination node includes:
determining a first set of distances between the source node and each other node of the plurality of nodes,
determining a second set of distances between the destination node and each other node of the plurality of nodes, and
identifying a set of hidden nodes, which are nodes that are not within a range of the source node, but able to interfere with the destination node, based on the first and second set of distances, and
simulating the communication of the messages includes simulating non-communication of at least one message based the set of hidden nodes.

36. A simulation system for simulating communications among a plurality of nodes in a network that includes:
a model of a communication channel that is common to the plurality of nodes and includes a channel state variable as an input parameter and provides a throughput measure as an output parameter,
a model of a MAC layer for each of the plurality of nodes that includes a dynamic state of the communication channel that varies during simulation,
wherein the model of the MAC layer is configured to facilitate simulation of communication of a message from a source node to a destination node during a current simulation time period by causing the simulation system to:
determine a current state of the communication channel,
use the model of the communication channel to determine a current throughput measure based on the current state of the communication channel, the communication channel being characterized as having a total available bandwidth that decreases with increased contention, and the model being configured to provide the throughput measure based on the total available bandwidth, which is determined based on the measure of contention, determine a service delay based on the current throughput measure, and simulate the communication of the message based on the service delay.

37. The simulation system of claim 36, wherein the state of the communication channel is dependent upon simulated effects of a physical layer.

38. The simulation system of claim 37, wherein the effects of the physical layer are dependent upon simulated locations of the source and destination nodes.

39. The simulation system of claim 36, wherein the state of the communication channel includes a measure of the plurality of nodes contending for the communication channel.

40. The simulation system of claim 36, wherein
the model of the communication channel also provides one or more of the following as other output parameters based on the state of the communication channel:
a likelihood of dropping messages, and
a retransmission rate, and
the simulation system is configured to simulate the communication of the messages based on one or both of these other output parameters.

41. The simulation system of claim 40, wherein the state of the communication channel includes a measure of the plurality of nodes contending for the communication channel.

42. The simulation system of claim 36, wherein the model of the communication channel is based on at least one of:
empirical evidence,
measurements based on actual communications, and
measurements based on other simulations of communication behavior in a single contention domain.

43. The simulation system of claim 36, wherein the model of the MAC layer is configured to cause the simulation system to determine each other node of the plurality of nodes that can reach the source node during the current simulation time period.

44. The simulation system of claim 36, wherein the model of the MAC layer is configured to cause the simulation system to:
determine a first set of distances between the source node and each other node of the plurality of nodes,
determine a second set of distances between the destination node and each other node of the plurality of nodes, and
identify a set of hidden nodes, which are nodes that are not within a range of the source node, but able to interfere with the destination node, based on the first and second set of distances, and
simulate the communication of the message, including non-delivery of at least one message based the set of hidden nodes.

* * * * *